(12) United States Patent
Schultz et al.

(10) Patent No.: US 8,381,939 B2
(45) Date of Patent: Feb. 26, 2013

(54) INSULATED STORAGE TANK

(75) Inventors: Garth J. Schultz, Oxford, MI (US); Ken Buttery, South Lyon, MI (US); Scott Leslie, Markham (CA)

(73) Assignee: Power Panel, Inc., Detroit, MI (US)

( * ) Notice: Subject to any disclaimer, the term of this patent is extended or adjusted under 35 U.S.C. 154(b) by 457 days.

(21) Appl. No.: 12/709,334

(22) Filed: Feb. 19, 2010

(65) Prior Publication Data

US 2010/0213201 A1 Aug. 26, 2010

Related U.S. Application Data

(60) Provisional application No. 61/208,275, filed on Feb. 20, 2009.

(51) Int. Cl.
*B65D 90/06* (2006.01)
*B65D 88/06* (2006.01)
*B65D 90/04* (2006.01)
*B65D 90/48* (2006.01)
*E03B 11/00* (2006.01)

(52) U.S. Cl. ............... 220/592.2; 220/565; 374/141; 73/292; 165/74

(58) Field of Classification Search .......... 374/141; 73/292; 220/565, 592.2; 165/74
See application file for complete search history.

(56) References Cited

U.S. PATENT DOCUMENTS

| | | | | |
|---|---|---|---|---|
| 3,010,599 A * | 11/1961 | Haines, Jr. et al. | ...... | 220/560.05 |
| 3,378,162 A * | 4/1968 | Smith | ...... | 220/560.05 |
| 3,456,835 A * | 7/1969 | Marcmann | ...... | 220/565 |
| 3,559,835 A * | 2/1971 | Lange | ...... | 220/560.12 |
| 4,296,799 A * | 10/1981 | Steele | ...... | 165/74 |
| 4,314,602 A | 2/1982 | Frederick et al. | | |
| 4,368,819 A | 1/1983 | Durham et al. | | |
| 4,407,268 A * | 10/1983 | Jardin | ...... | 126/618 |
| 4,461,398 A | 7/1984 | Argy | | |
| 4,498,602 A * | 2/1985 | Sattelberg et al. | ...... | 220/560.05 |
| 4,907,569 A * | 3/1990 | Lemense | ...... | 220/567.3 |
| 6,938,478 B2 * | 9/2005 | Arias | ...... | 73/304 R |
| 7,665,358 B2 * | 2/2010 | Calabrese | ...... | 73/304 R |
| 8,152,367 B2 * | 4/2012 | Roberts et al. | ...... | 374/141 |
| 2005/0265425 A1 * | 12/2005 | Heldberg | ...... | 374/185 |
| 2011/0277677 A1 * | 11/2011 | Sommardal | ...... | 114/74 A |

FOREIGN PATENT DOCUMENTS

JP 2006-077994 3/2006

OTHER PUBLICATIONS

International Search Report for International Application No. PCT/US2010/024758 mailed Sep. 16, 2010.
Written Opinion of the International Searching Authority for International Application No. PCT/US2010/024758 mailed Sep. 16, 2010.

* cited by examiner

*Primary Examiner* — Christopher Fulton
(74) *Attorney, Agent, or Firm* — Harness, Dickey & Pierce, P.L.C.

(57) ABSTRACT

An insulated storage tank incorporating modular panels includes a structural rigidity to store large volumes of hot and cold liquids. The insulated storage tank includes a plurality of insulating panels disposed on an insulation substrate in a circumferential pattern, the insulating panels each in proximate contact with two other panels forming a cylindrical wall. The insulating panels are a rigid structure and provide structural support to an inner liner disposed within the cylindrical wall and operable to be filled with a hot or cold liquid. The cylindrical wall of insulating panels is further supported by a thin outer support jacket. The insulated storage tank has a lid disposed on the insulating panels thereby sealing the contents of the insulated storage tank.

18 Claims, 7 Drawing Sheets

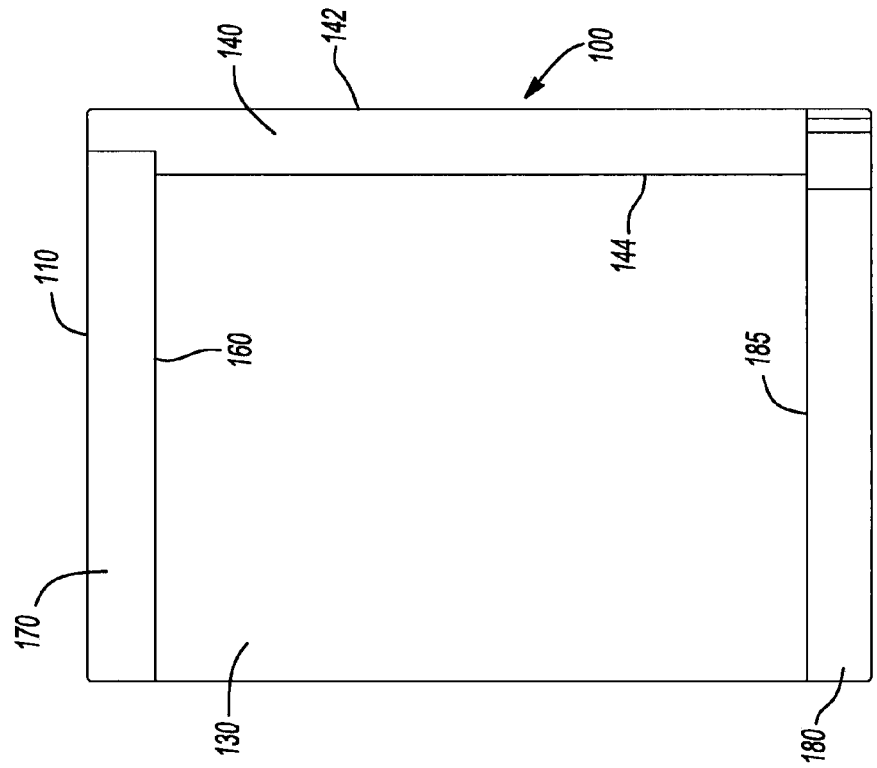
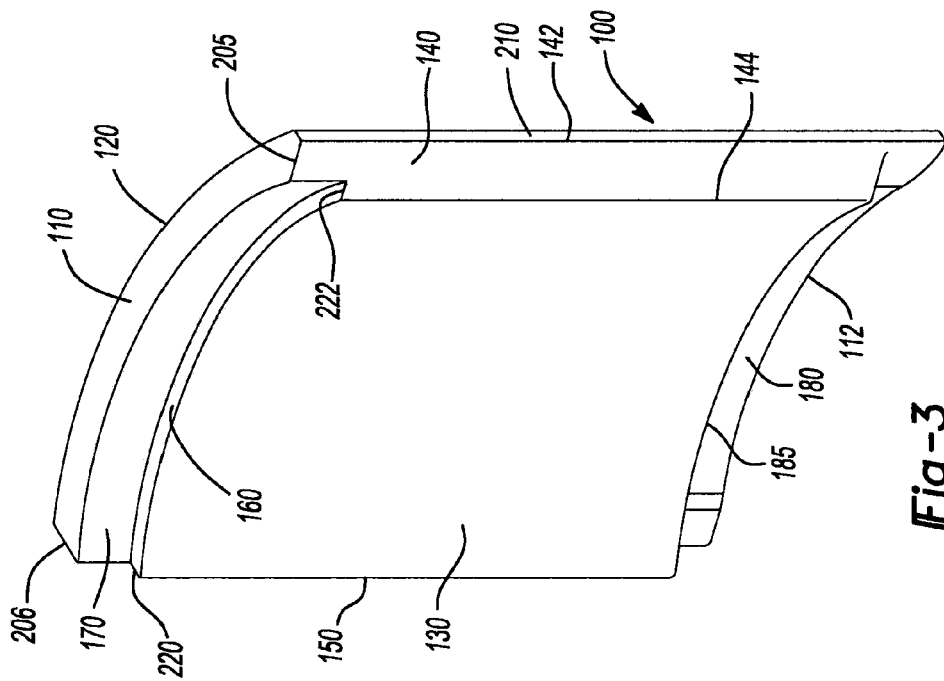

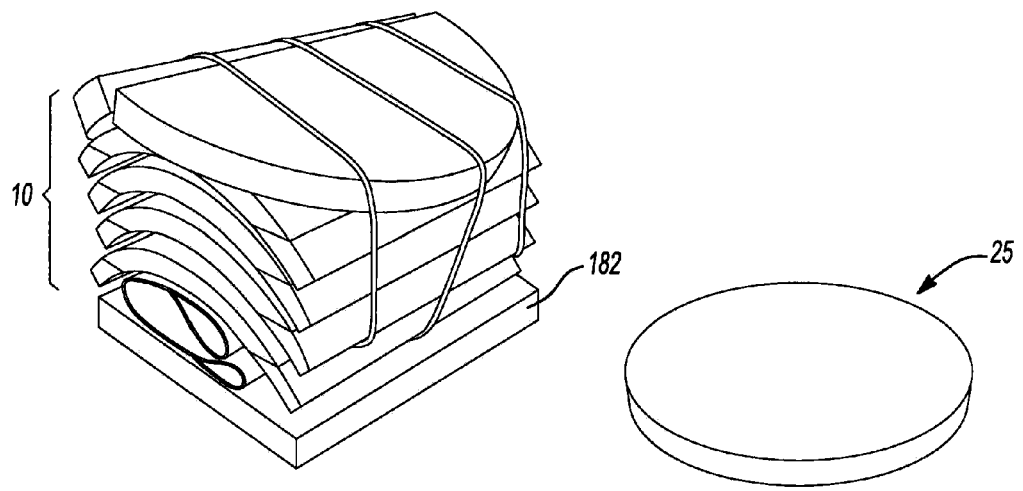
*Fig-9A*
*Fig-9B*
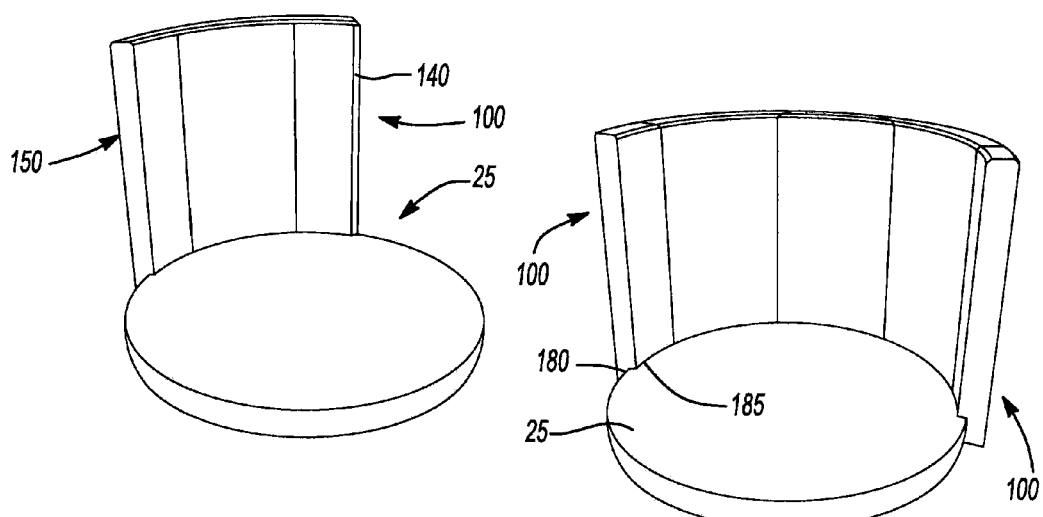
*Fig-9C*
*Fig-9D*

INSULATED STORAGE TANK

CROSS-REFERENCE TO RELATED APPLICATIONS

This application claims the benefit of U.S. Provisional Application No. 61/208,275 filed on Feb. 20, 2009. The entire disclosure of the above application is incorporated herein by reference.

FIELD

The present disclosure relates to thermally insulated storage tanks. More particularly, the present technology relates to a modular, thermally insulated storage tank for storing hot or cold liquids.

BACKGROUND

The statements in this section merely provide background information related to the present disclosure and may not constitute prior art.

Each day, the sun provides 10,000 times the amount of energy utilized by the human race. In a single day, it provides more energy than our current population would consume in 27 years. In North America alone, it is believed that close to two trillion dollars is spent annually on energy, much of which is designated towards non-renewable, carbon-based sources, such as oil, coal, and other fossil fuels. When energy consumption for the average U.S. household is approximately 65-80% thermal and approximately 20-35% electrical, it makes sense to derive a means of satisfying both of these requirements through renewable sources.

There have been many advances in the past few decades toward the capture of renewable energy resources, such as water turbines (which convert the kinetic energy of moving water into electricity), wind generators (which convert the energy of the wind into electrical energy), geothermal heating (which utilizes the stability of the subterraneous temperature to provide thermal energy), and solar cells (which allow the capture and conversion of solar energy into electrical energy).

An alternative type of renewable energy is a solar thermal heat exchanger, which utilizes the energy of sunlight to heat a liquid, thereby providing thermal energy for heating or cooling. In this type of energy harnessing, typically a flat plate is blackened on the front to improve absorption of solar radiation and is arranged with its blackened surface facing the sun and sloped at a suitable angle to optimize the energy collected. A series of tubes is secured to the panel, and water to be heated is circulated through these tubes to extract the heat received by the panel. The innovative thermal capture systems require that the circulated heated water be stored for further energy extraction. The warmed water from solar thermal heat exchangers is normally circulated through a separate tank so that the temperature may build up to a maximum value being a balance between the heat input and heat losses in the system. This water can then be used as feed water for heating non-heated water for domestic use through the use of in tank heat exchangers.

While the volumes of heated recirculation water varies with the size of the solar thermal heat exchangers mounted to a residential or commercial structure, a tank of sufficient size to store all of the systems liquid is required to be maintained on site. To maximize thermal energy capture, these liquid storage tanks are often located in basements of homes and businesses, particularly in the northern climates where placement of the storage tank in the exterior of the building structure may lead to tank failure and at best, loss of captured thermal energy, especially in the winter months. Similar but opposite considerations apply for the storage of cold liquids, refrigerants and the like in warmer climates, where the most suitable storage location for these tanks are also often in lower levels of the home or business, especially during the hotter months.

Often, large prefabricated storage tanks are difficult to maneuver and placement in lower levels and basements of homes and businesses are hampered by the fact that the average door widths range from 87 to 92 cm (34¼ to 36¼ inches), far smaller than the dimensions of the storage tanks. Moreover, given their bulk and weight, prefabricated storage tanks in capacities of hundreds of gallons to thousands of gallons are difficult to reposition once they have been previously established.

SUMMARY

It is therefore an object of the present technology to provide a thermally insulated storage tank, which may provide a temperature, regulated liquid for circulation to an outside tank or other thermal capture devices.

It is another object of the present technology to provide a thermally insulated storage tank that is thermally highly efficient in design, by being modular and easily assembled in difficult to reach areas.

A further object of the present technology is to provide a thermally regulated storage tank that can interface with a business or residential thermal capture panel system. A liquid stored in the thermally insulated tank is capable of heating or cooling a second source of circulating water for domestic or commercial use. When the stored liquid is hot, it can then be recirculated back to the thermal capture system to become reheated again.

Finally, it is an object of the present technology to provide an insulated storage tank, which is both economical and simple to manufacture, as well as easy to install.

These and other objects will become apparent from the present technology comprising an insulated storage tank designed to incorporate a means of storing both hot and cold liquids including water, antifreeze and compressed liquefied gasses. The insulated storage tank includes an inner liner supported by a plurality of vertical insulating panels. The insulating panels are arranged circumferentially to form a cylinder, each insulating panel in contact with a leading edge and a trailing edge of another insulating panel. The insulating panels are freestanding and are further supported by an outer support jacket. The liquid is placed within the inner liner and will assert a force against the insulating panels. Thermal energy in the liquids are further insulated by an insulating lid that is disposed within the upper circumference of the insulating panels and forms an insulating seal with the inner liner. Optionally, the insulating panel rests on an insulating floor that is sized and shaped to fit within the void provided by the lower circumference of the insulating panels Other optional components can include a plumbing board having inlet and outlet liquid ports for introducing and removing liquid from the insulated storage tank chamber, microprocessors and pumps, temperature sensors, water level sensors and other monitoring systems to regulate the volume and temperature of a liquid in the thermally insulated tank. Also contemplated as an optional feature includes a heat exchanger operable to circulate a liquid, for example, domestic potable water capable of being heated by the stored liquid in the insulated storage tank. The potable water can be used for domestic purposes such as filling a home hot water tank, for use in laundry, for heating the home and other known heating or cooling applications.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 3 is a perspective view of an insulating panel comprising the preferred embodiment of the present technology;

FIG. 4 is a side elevation view of the insulating panel of FIG. 3 comprising the preferred embodiment insulated storage tank of the present technology;

FIG. 9A is a perspective view depicting a prepackaged insulated storage tank on a pallet;

FIG. 9B is a perspective view of the insulating floor during a first construction step;

FIG. 9C is a perspective view modified from FIG. 9B to include an insulating wall portion;

FIG. 9D is a perspective view modified from FIG. 9C to include further insulating wall portions;

Corresponding reference numerals indicate corresponding parts throughout the several views of the drawings.

DETAILED DESCRIPTION

Figure 1:
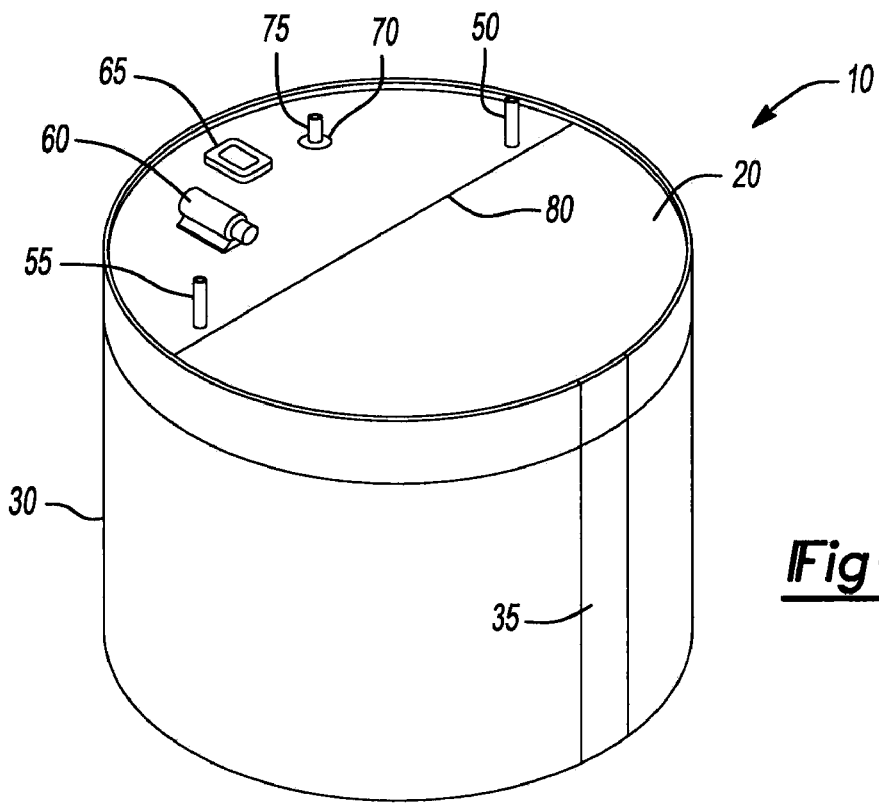
FIG. 1 is a perspective view of the thermally insulated tank comprising the preferred embodiment of the present technology.

The following description is merely exemplary in nature and is not intended to limit the present disclosure, application, or uses. It should be understood that throughout the drawings, corresponding reference numerals indicate like or corresponding parts and features.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
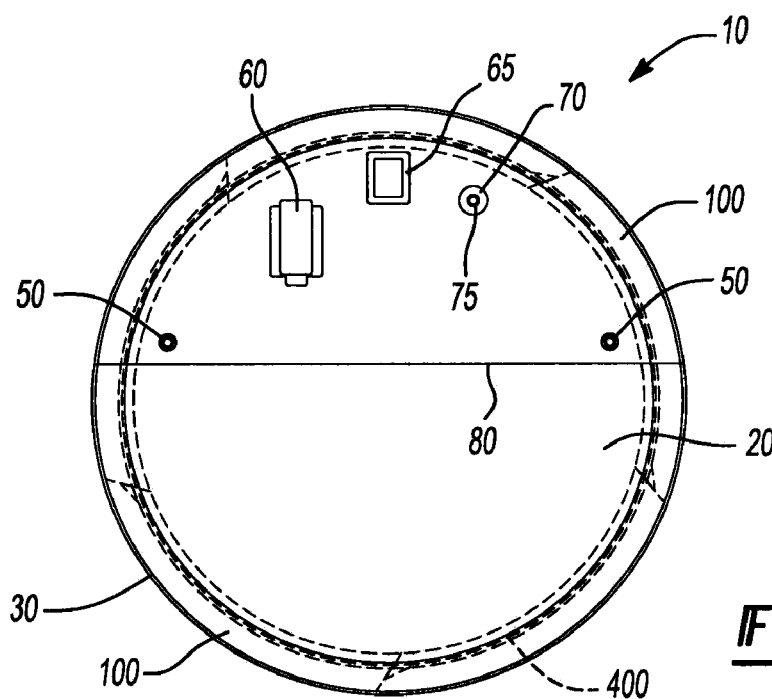
FIG. 2 is a top plan view of the thermally insulated tank with the lid in place.
Figure 5:
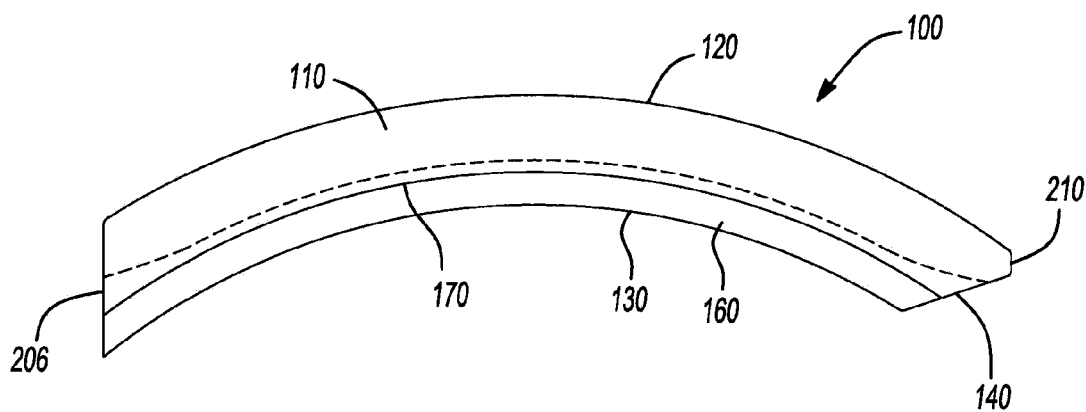
FIG. 5 is a plan view as viewed from the top of the insulating panel of the present technology.
Figure 6:
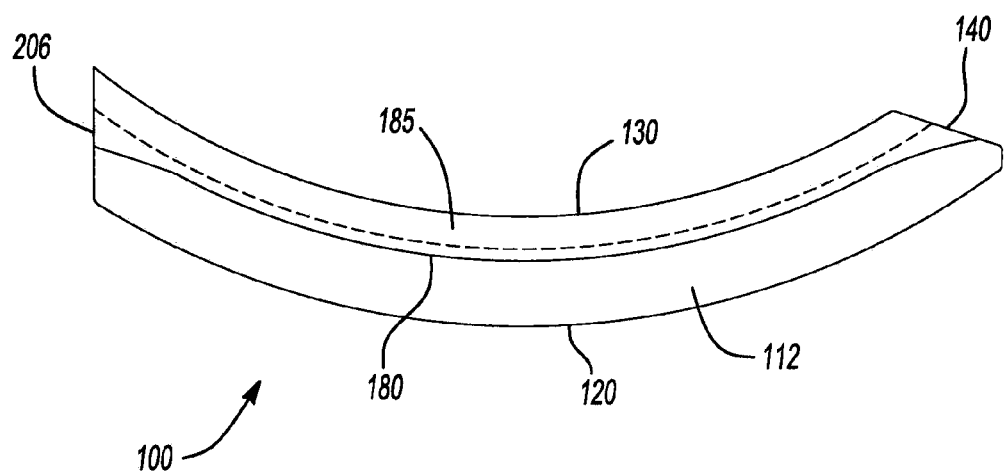
FIG. 6 is a plan view as viewed from the bottom of the insulating panel of the present technology.

Referring now to the figures, particularly FIGS. 1 and 2, the preferred embodiment of the present technology comprising an insulated storage tank 10 is shown. The insulated storage tank 10 comprises an outer support jacket 30, a plurality of insulating panels 100 in proximate contact with outer support jacket 30, an inner liner 400 which conforms to the interior cavity of the thermally insulated tank 10 and an insulating lid 20 covering the circular opening to the insulated storage tank 10. The insulated storage tank 10 comprises a generally cylindrical-shape. The thin outer support jacket 30 surrounds the exterior arcuate surface of insulating panels 100 shown in FIG. 2. The outer support jacket 10 provides structural rigidity and assists insulating panels 100 from collapsing or being forced apart. Outer support jacket 30 has a length that is generally slightly longer than the circumference of the insulated storage tank 10. The outer support jacket 30 has a height that is typically the same height of insulated storage tank 10. The outer support jacket 30 can be made from any structurally resilient polymer, plastic, metal or wood, including for example thermoplastic polyolefin (TPO) materials commercially available as SEQUEL E3000 sold by Solvay Engineered Polymers Inc. (Auburn Hills, Mich., USA), In some embodiments the outer support jacket 30 can have a width ranging from about 0.1 mm about 10 mm wide, or from about 1 mm to about 10 mm, or from about 2 mm to about 10 mm, or from about 0.1 mm to about 9 mm, or from about 0.1 mm to about 7 mm, or from about 0.1 mm to about 5 mm. The ends 35 of the outer support jacket 30 can be overlaid and glued together around the insulating panels 100 as shown in FIG. 1.

In some embodiments, the insulated storage tank 10 includes an insulating lid 20. Insulating lid 20 can be made from any generally known insulation material including expanded polypropylene, thermosetting plastic foams, thermoplastic polyolefins, fiberglass, expanded perlite, wood, metals and any material that is capable of retaining the heat or cold in the liquids within the insulated storage tank 10. Foam is preferably used because of the superior heat transfer properties provided by foam materials, relative ease of manufacture and it's lightweight. As shown in FIGS. 1 and 2, the insulating lid 20 can be apportioned along a midline 80 in two sections to allow the opening and removal of one half of the lid while keeping the other half in place.

The insulating lid 20 can optionally house, support and integrate a variety of mechanical and electrical components that provide diagnostic and operational functionality to the insulated storage tank 10. For example, insulating lid 20 can be mounted with a plumbing board to provide all of the hydraulic operational requirements of the tank, for example, liquid input and output and sampling. Control unit 60 can also include a variety of mechanical and electrical components such as logic boards, relays, microprocessors and the like to send and receive electrical signals to and from a variety of mechanical and electrical components, for example, pumps and sensors. A variety of sensors can be included and mounted onto insulating lid 20, for example, water level sensor 75 mounted to the lid with the aid of a seal 70. Water level sensor 75 can be free-standing or can be integrated with control unit 60 and a pump (not shown) to determine the level of liquid in the insulated storage tank 10. Upon liquid volume loss in the insulated storage tank 10, liquid level sensor 75 can detect the deficiency and send a signal to control unit 60 to activate a pump to fill the tank with more liquid. Temperature sensor 65 can also be integrated with control unit 60 and measure the temperature of the liquid in the insulated storage tank 10.

If the liquid in the insulated storage tank 10 falls below a predetermined threshold, temperature sensor 65 can send a signal to a valve (not shown) to reduce the volume of liquid being recirculated on the roof of a residence from entering into the insulated storage tank 10. Alternatively, the temperature sensor 65 can alert the system if the liquid in the insulated storage tank 10 rises above a predetermined threshold. In such a case, the temperature sensor 65 can send a signal to a pump (not shown) to increase the flow of a secondary liquid being circulated in a heat exchanger (not shown) which is placed in the insulated storage tank 10 to extract heat from the liquid in the insulated storage tank 10. In addition, liquid inlet 50 and liquid outlet 55 can be used to add materials into the insulated storage tank 10, or to remove materials, including liquids, within the insulated storage tank 10. Generally, insulating lid 20 has a diameter that is slightly larger than the internal diameter 500 shown in FIG. 8. The thickness of insulating lid 20 can vary and is not critical. However, for aesthetic appeal, the exterior surface of the insulating lid 20 can be generally flush with the horizontal rim surface 110 of the insulating panels 100 shown in greater detail in FIG. 3.

Figure 9E:
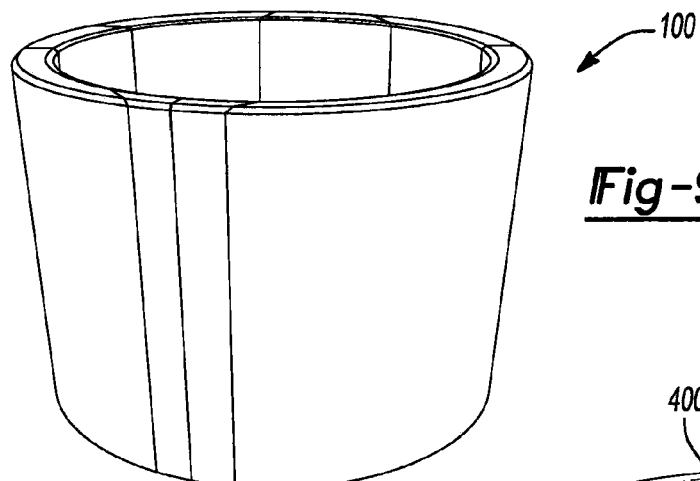
FIG. 9E is a perspective view modified from FIG. 9D to include all of the insulating wall portions in assembled form.
Figure 9F:
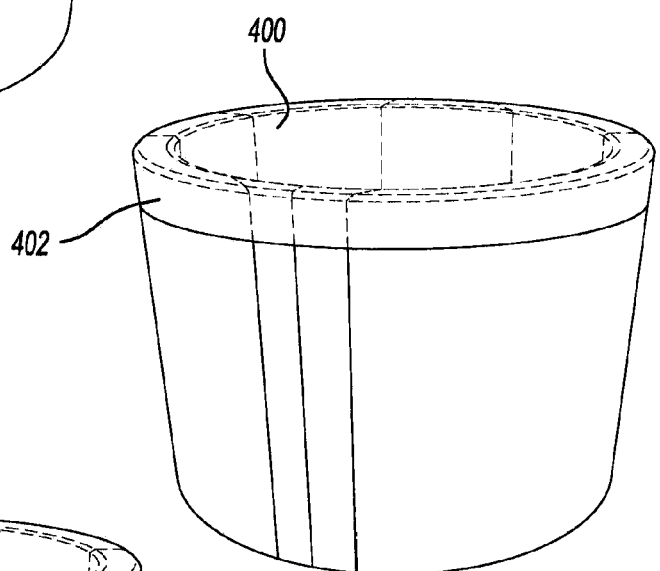
FIG. 9F is a perspective view modified from FIG. 9E to further show an inner liner in an installed position.
Figure 9G:
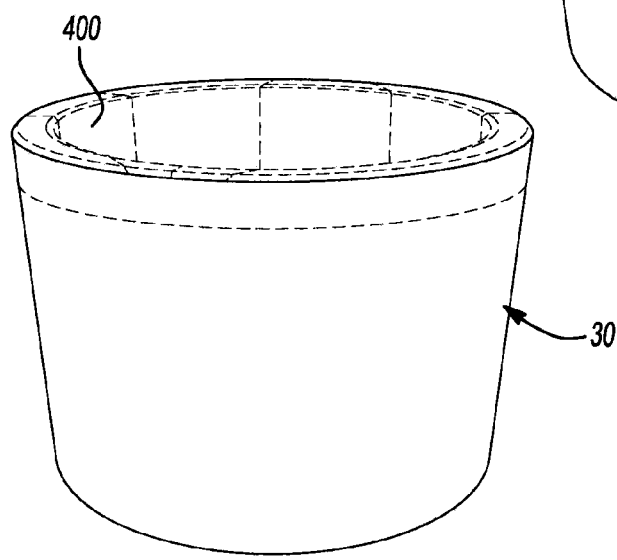
FIG. 9G is a perspective view modified from FIG. 9F to further show the outer support jacket in an installed position.
Figure 10:
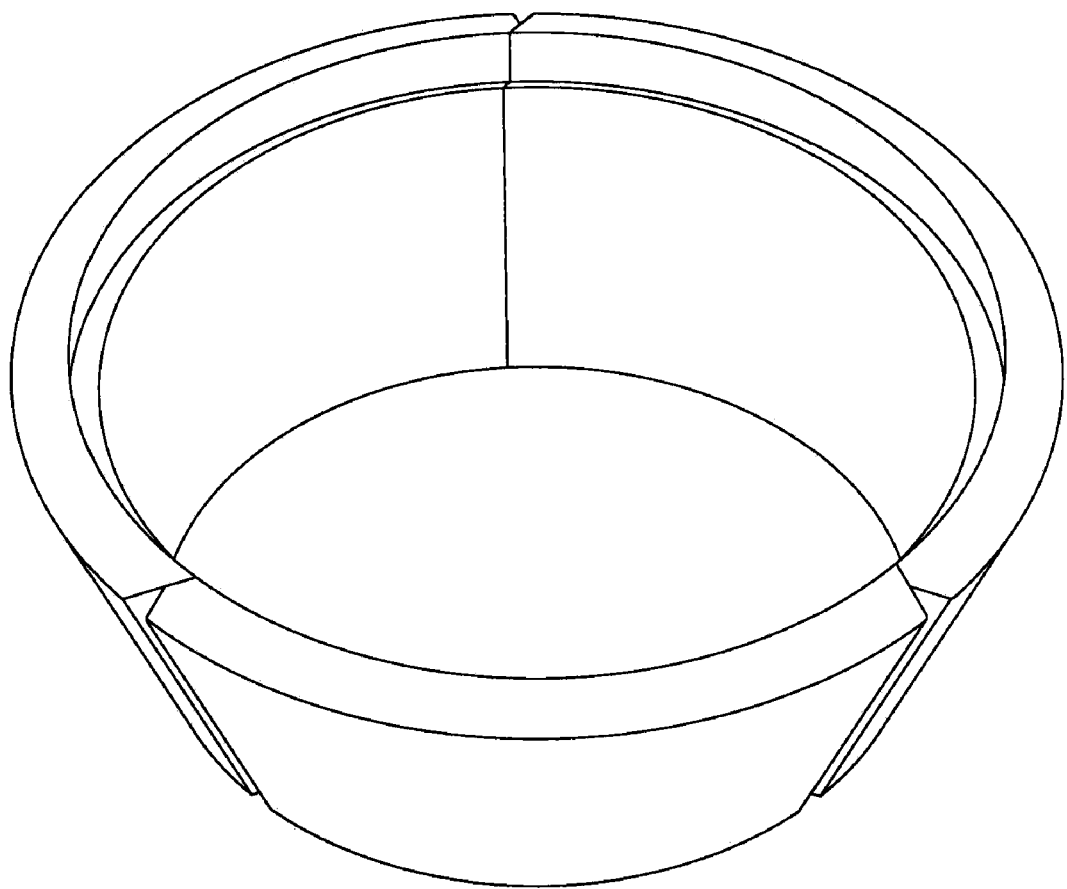
FIG. 10 is a top perspective view of the insulating panels arranged in a cylindrical fashion prior to circumferential application of the outer support jacket around the insulating panels.

Referring now to FIGS. 3-6 and 8-10, the insulated storage tank 10 also includes a plurality of vertical insulating panels 100. In some embodiments, the insulating panels 100 are the cylindrical side walls of the insulated storage tank 10 that supports the insulating lid 20. In use the insulating lid 20 is placed on the lid resting shelf 160. With reference to FIG. 3, illustrating the insulating panel 100 in perspective view, the insulating panel 100 has a rim and a horizontal rim surface 110, the rim also includes a rim side wall 170 and lid resting shelf 160. Insulating panel 100 has a leading edge contact surface 140 and a trailing edge contact surface 150. The insulating floor 25 is slotted into the recess formed by floor contact wall 180 and floor support shelf 185. When the complete cylinder is formed by aligning all of the required insulating panels 100 as shown in FIGS. 9 and 10 along with the insulating floor 25, the inner liner 400 can be placed in the void created by the arrangement of the insulating panels 100 and insulating floor 25 as shown in FIG. 9. The inner liner 400 rests against and is supported by interior arcuate surface 130 of insulating panel 100.

Insulating panel 100 has a leading edge contact surface 140 forms a leading edge apex 142 with a trailing edge offset 210. The placement of the leading edge contact surface 140 of one insulating panel 100 in direct contact with the trailing edge contact surface 150 of the next insulating panel 100 in succession (in a clock wise fashion) has been surprisingly found to provide substantial resistance to radial movement of the insulating panels due to the hydrostatic force created by liquid. All of the insulating panels 100 can be connected with the use of a clasping mechanism placed on the exterior arcuate surface 120. Alternatively, the leading edge contact surface 140 and the trailing edge contact surface 150 of insulating panels 100 can each have male and female interlocking structure that can approximate the two contact surfaces 140 and 150 and lock them into position. Preferably, the insulating panel 100 can all be clasped or structurally held in position by placing an outer support jacket 30 around the exterior arcuate surface 120 as shown in FIGS. 1 and 9.

It has been determined that for a 60 inch outer diameter/350 gallon insulated storage tank 10, the pressure exerted on a 1 mm thick TPO outer support jacket 30 after the insulated storage tank 10 has been fully assembled having an insulating panel thickness of 4.4 inches, and an inner liner 400 storing 330 gal of water, 1 m high column of water, inner tank radius of 25.6 inches) is approximately 1084 psi which is well within its tensile yield of 3100 psi. For a 2000 gallon tank with a 2 mm thick TPO outer support jacket using the same column water height but an inner radius of 61.1 inches, the stress on the outer support jacket 30 is approximately 1184.5 psi and is also well within its tensile yield of 3100 psi.

The insulating panel 100 can also be made of any suitable modular material as described above for the insulating lid 20. These can include expanded polypropylene, thermosetting plastic foams, thermoplastic polyolefins, fiberglass, expanded perlite, wood, metals and any material that is capable of retaining the heat or cold in the liquids within the insulated storage tank 10. Foam is preferably used because of the superior heat transfer properties provided by foam materials, relative ease of manufacture and is lightweight. The dimensions of the insulating panel 100 can vary according to the size of the insulated storage tank 10 needed. For example, for a 330 gallon insulated storage tank, 5 insulating panels 100 can be used form a complete cylinder. For a 330 gallon insulated storage tank 10, each insulating panel 100 can measure approximately 47 inches in height, an arcuate length of 34.5 inches and a width of approximately 4 inches. In some embodiments, the number of insulating panels 100 used to form the insulated storage tank 10 can vary, preferably there are 5 insulating panel 100 per insulated storage tank 10.

Figure 7:
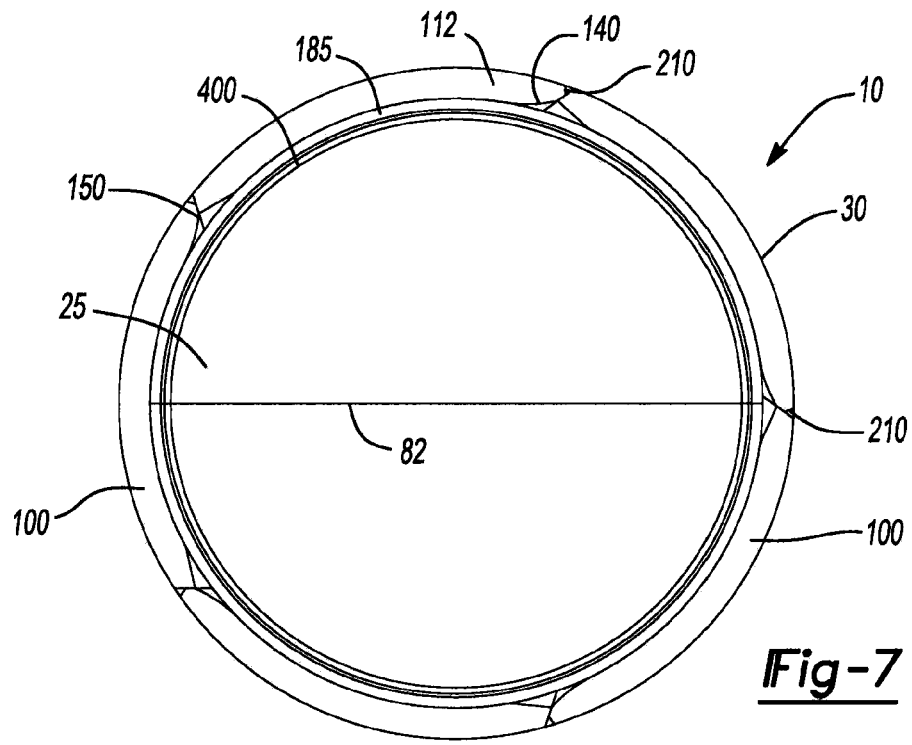
FIG. 7 is a plan view of the bottom of the insulated storage tank comprising the preferred embodiment insulated storage tank of the present technology.
Figure 8:
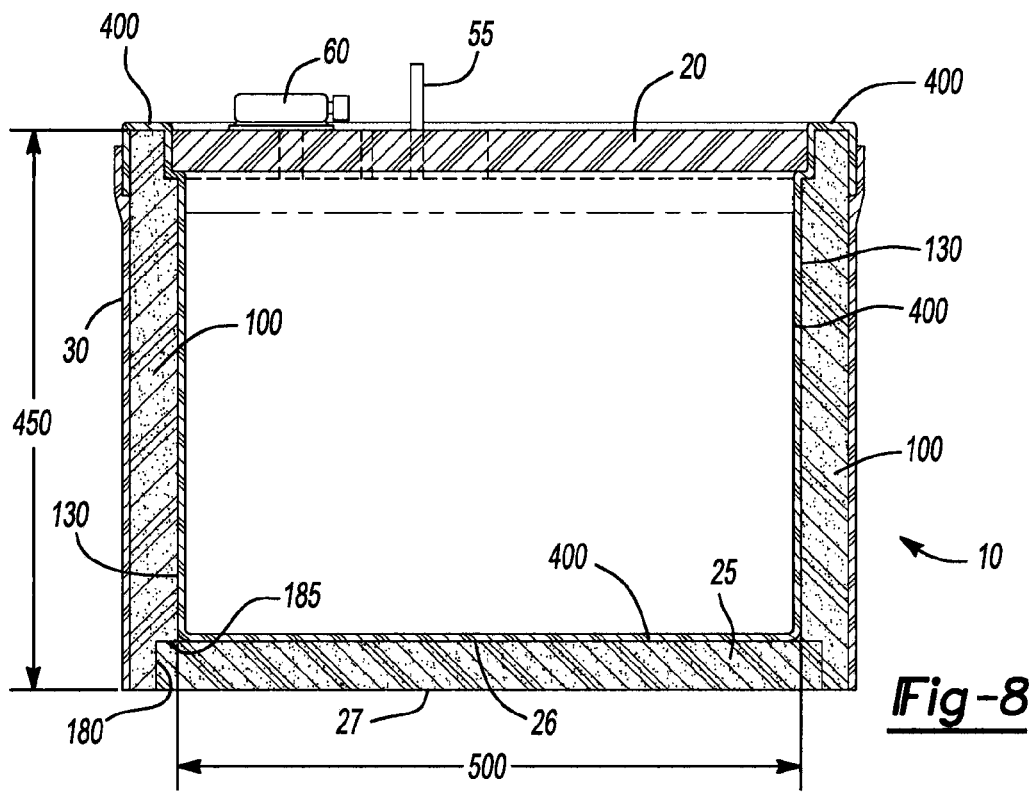
FIG. 8 is a cross-section view of the insulated storage tank comprising the preferred embodiment insulated storage tank of the present technology.

In some embodiments of the present technology, the insulated storage tank 10 can also optionally have an insulating floor 25. While not essential to the practice of the present technology, an insulating floor 25 can be used with the bottom cutout in the insulating panel 100 to provide a unified structure that is configured to resist the hydrostatic stresses imposed on the insulated storage tank 100 walls. As illustrated in FIGS. 7 and 8, the insulating floor 25 can be made from any insulation material as described above for the insulating panel 100. Insulating floor 25 can be a single piece of insulation or it can be made from two halves divided by the line 82 as shown in FIG. 7.

Best shown in FIG. 8, the inner liner 400 can be constructed from any synthetic or natural material that is capable of withstanding liquids having temperatures ranging from about 0° C. to about 250° C., preferably from about 4° C. to about 190° C. In some embodiments, the inner liner 400 can be constructed of a synthetic plastic material, polymer material or thermoplastic materials capable of withstanding liquid temperatures ranging from about 0° C. to about 250° C. In some embodiments, the inner liner 400 can be made from a poly vinyl chloride material.

With general reference now to FIGS. 9A-9G and 10, and with specific reference to FIG. 9A, the insulated storage tank 10 can be prepacked on a pallet 182 saving transportation costs and freight charges. The small footprint of the delivery package containing the modular insulated storage tank also affords vastly improved maneuverability and locations for installation. As shown in FIG. 9B, the modular parts of the insulated storage tank 10 can be easily assembled by first preparing the insulating floor 25. As previously noted, the insulating floor 25 is not essential to the invention. However, it is preferred to other forms of insulation flooring. As sequentially shown in FIGS. 9C-9E, the insulating panels 150 are fitted with floor contact walls 180 and floor support shelves 185; then, the insulating panel 100 can be slotted into position adjacent and on top of insulating floor 25. Then, as shown in FIGS. 9C-9E, all of the insulating panels 100 are placed around the floor 25, ensuring that the leading edge contact surface 140 and a trailing edge contact surface 150 of insulating panels 100 are abutting one another. As shown in FIG. 9F, once the insulating panels 100 have been positioned around the insulating floor 25 the next step is to place the inner liner 400 into the cavity of the insulated storage tank 10 and leave an overhang 402 of inner liner 400 extend over the horizontal rim surface 110 of the insulating panels 100. As shown in FIG. 9G, the last step can include placing an outer support jacket 30 around the exterior arcuate surface of all of the insulating panels 100 and joining the ends of the outer support jacket 30 leaving a joint 35 as shown in FIG. 1.

The present technology affords a simple manner in which to prepare on site an insulated storage tank having liquid capacities ranging from 50 gallons to 5,000 gallons. The insulated storage tank has many used for storing both hot and cold liquids.

In a preferred embodiment, the hot liquid stored in the insulated storage tank 10 can include liquids (e.g. water), that are recirculated through a solar thermal capture device, for example, the Power Panel Solar/Thermal capture device disclosed in International Application PCT/US2008/078822, filed Oct. 3, 2008, the disclosure of which is incorporated herein in its entirety. The stored hot liquids (e.g. water) recirculating through said Power Panel Solar/Thermal capture device can reach temperatures ranging from 75-120° C. The stored hot liquid in the insulated storage tank 10 of the present technology can be used to heat a secondary potable water source (for example a domestic home water source) with the use of heat exchangers placed in the insulated storage tank 10. Similarly, heat exchangers placed in insulated storage tanks storing compressed liquids such as carbon dioxide can be used to cool a secondary liquid source for residential or commercial cooling. The rate of recirculation through the solar/thermal energy capture device and passage into the insulated storage tank 10 can be automated to maintain a set temperature within the insulated storage tank 10.

The embodiments and the examples described herein are exemplary and not intended to be limiting in describing the full scope of compositions and methods of the present technology. Equivalent changes, modifications and variations of some embodiments, materials, compositions and methods can be made within the scope of the present technology, with substantially similar results.

What is claimed is:
1. An insulated storage tank, comprising:
  a plurality of insulating panels disposed in a circumferential pattern, the insulating panels each in contact with two other panels forming a cylindrical wall, individual ones of the insulating panels each including a leading edge contact surface forming a leading edge apex and a trailing edge offset, and an oppositely located trailing edge contact surface, wherein the leading edge contact surface of one of the insulating panels is placed in direct contact with the trailing edge contact surface of a next successive one of the insulating panels;
  an inner liner disposed within the cylindrical wall to be filled with a hot or cold liquid and conforming in shape to the insulating panels;
  an outer support jacket surrounding an exterior arcuate surface of the cylindrical wall of insulating panels.
2. The insulated storage tank of claim 1, further comprising:
  a lid resting shelf created on an interior facing rim side wall of the cylindrical wall; and
  a substantially circular insulated tank lid disposed on the lid resting shelf thereby sealing the contents of the insulated storage tank.
3. The insulated storage tank of claim 2, further comprising:
  a control unit disposed on the tank lid;
  a water level sensor disposed on the tank lid and integrated with the control unit, the water level sensor operating to measure a liquid level within the storage tank and create a signal used by the control unit to control a flow of the liquid into and out of the storage tank to vary the liquid level; and a temperature sensor disposed on the tank lid and integrated with the control unit, the temperature sensor operating to measure a temperature of the liquid within the storage tank and create a signal used by the control unit to control a flow of the liquid into and out of the storage tank to vary the temperature of the liquid.

4. The insulated storage tank of claim 1, wherein the inner liner is constructed from a polymeric material capable of retaining a liquid at a temperature ranging from approximately zero degrees Centigrade to approximately 250 degrees Centigrade inclusive.

5. The insulated storage tank of claim 1, wherein the outer support jacket has a length greater than an outer circumference of the cylindrical wall of the insulated storage tank and a height substantially equal to a height of the cylindrical wall.

6. The insulated storage tank of claim 1, wherein the outer support jacket comprises a polymeric material having a width ranging from approximately 0.1 mm to 10 mm inclusive, the outer support jacket having ends overlapped with each other and fixedly connected to each other.

7. An insulated storage tank, comprising:
a plurality of arcuate-shaped insulating panels disposed in a circumferential pattern, the insulating panels each in contact with two other panels forming a cylindrical wall;
an inner liner disposed within the cylindrical wall to be filled with a hot or cold liquid and conforming in shape to the insulating panels;
an outer support jacket surrounding an exterior arcuate surface of the cylindrical wall of insulating panels, the outer support jacket;
a substantially circular insulated tank lid disposed on the cylindrical wall and in contact with the inner liner to seal the liquid contained in the insulated storage tank;
a control unit disposed on the tank lid;
a water level sensor disposed on the tank lid and integrated with the control unit; and
a temperature sensor disposed on the tank lid and integrated with the control unit;
wherein the tank lid is divisible into first and second portions, each of the control unit, the water level sensor, and the temperature sensor being disposed a same one of the first or second portion such that the opposite one of the first or second portions can be opened without interfering with operation of any of the control unit, the water level sensor, or the temperature sensor.

8. The insulated storage tank of claim 7, wherein the water level sensor operates to measure a liquid level within the storage tank and create a signal used by the control unit to control a flow of the liquid into and out of the storage tank to vary the liquid level.

9. The insulated storage tank of claim 7, wherein the temperature sensor operating to measure a temperature of the liquid within the storage tank and create a signal used by the control unit to control a flow of the liquid into and out of the storage tank to vary the temperature of the liquid.

10. The insulated storage tank of claim 7, further comprising an insulating floor slotted to be received into a recess formed by a floor contact wall and a floor support shelf created in the cylindrical wall.

11. The insulated storage tank of claim 10, wherein the inner liner is supported on the insulating floor.

12. The insulated storage tank of claim 7, further comprising a lid resting shelf created on an interior facing rim side wall of the cylindrical wall, wherein the inner liner is in contact with the lid resting shelf and the tank lid is disposed on the inner liner and supported by the lid resting shelf.

13. The insulated storage tank of claim 7, wherein a quantity of five of the arcuate-shaped insulating panels are joined to create at least first and second liquid capacities of the storage tank, an arcuate length of each of the arcuate-shaped insulating panels being varied to vary an inner tank radius to differentiate the first and second liquid capacities.

14. A method for constructing an insulated storage tank, the storage tank including a plurality of insulating panels, individual ones of the insulating panels each including a leading edge contact surface forming a leading edge apex and a trailing edge offset, and an oppositely located trailing edge contact surface, an inner liner, an insulating lid, an insulating floor; and an outer support jacket, the method comprising:
creating floor contact walls and floor support shelves in each of the insulating panels;
slotting the insulating panels into position adjacent and on top of the insulating floor such that all of the insulating panels are placed around the floor having the leading edge contact surface and the trailing edge contact surface of proximate insulating panels abutting one another creating a cylindrical wall;
inserting the inner liner into a cavity created by the insulating panels such that the inner liner covers the insulating floor and lines an inner circumference of the insulating panels; and
placing the outer support jacket around an exterior arcuate surface of all of the insulating panels.

15. The method of claim 14, further comprising creating an overhang of the inner liner extending over a horizontal rim surface of the insulating panels during the placing step.

16. The method of claim 15, further comprising forming a lid resting shelf on an interior facing rim side wall of the cylindrical wall during the creating step.

17. The method of claim 16, further comprising disposing the tank lid on the inner liner extending over the horizontal rim surface of the insulating panels and supported by the lid resting shelf.

18. The method of claim 14, further comprising joining opposite ends of the outer support jacket to creating a joint.

* * * * *